No. 731,031. PATENTED JUNE 16, 1903.
L. H. FLORY.
PIPE UNION.
APPLICATION FILED JULY 22, 1901.
NO MODEL.
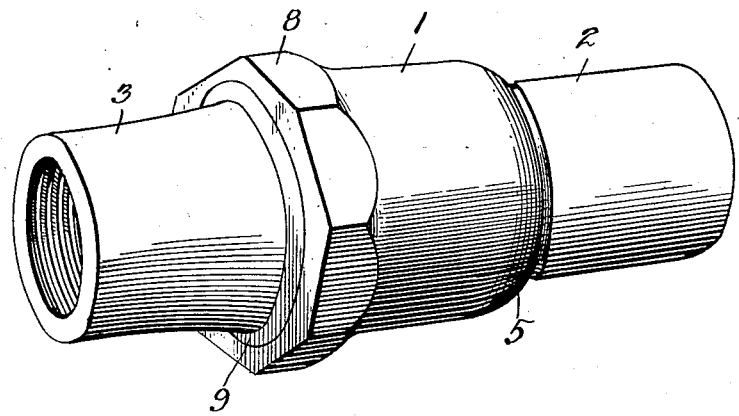
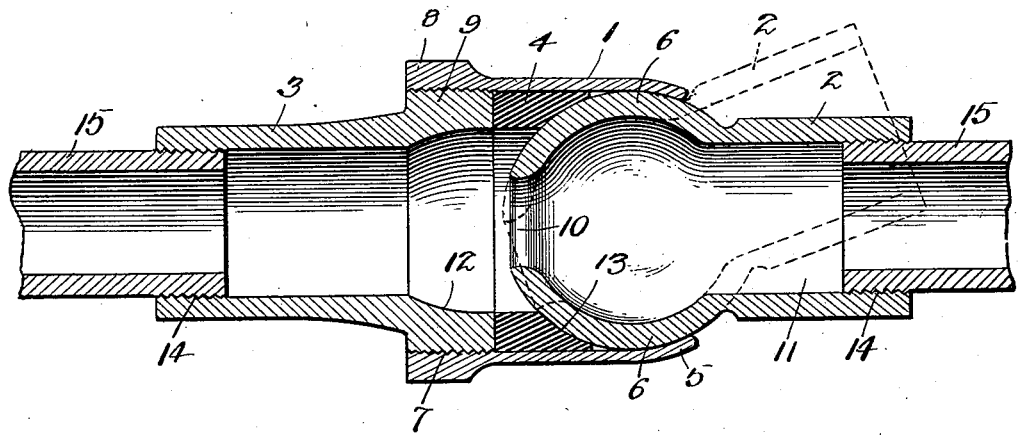
Witnesses
F. E. Alden,
R. M. Elliott.
L. H. Flory, Inventor
by C. A. Snow & Co.
Attorneys No. 731,031.

Patented June 16, 1903.

UNITED STATES PATENT OFFICE.

LLEWELLYN H. FLORY, OF ASHLEY, PENNSYLVANIA.

PIPE-UNION.

SPECIFICATION forming part of Letters Patent No. 731,031, dated June 16, 1903.

Application filed July 22, 1901. Serial No. 69,285. (No model.)

*To all whom it may concern:*

Be it known that I, LLEWELLYN H. FLORY, a citizen of the United States, residing at Ashley, in the county of Luzerne and State of Pennsylvania, have invented a new and useful Pipe-Union, of which the following is a specification.

This invention relates to pipe-unions, and it has for its object to provide a device of this class which shall be simple and inexpensive and which shall be adapted for connecting two sections of pipe, whether the said sections be or be not in alinement with each other.

A special object of my invention is to provide a pipe-union which shall be especially adapted for plumbers' use in connecting sections of lead or other flexible pipe which have heretofore been usually connected by wipe-joints and which it is sometimes extremely difficult to bring into alinement with each other in order that the proper connection may be made, hours being frequently consumed when by the use of my invention a few minutes only would be required to permanently connect the parts.

With these ends in view my invention consists in the improved construction, arrangement, and combination of parts, which will be hereinafter fully described, and particularly pointed out in the claim.

In the accompanying drawings, forming a part of this specification, and in which like numerals of reference indicate corresponding parts, I have illustrated a form of embodiment of my invention capable of carrying my ideas into effect, it being understood that the elements herein exhibited may be varied or changed as to shape, proportion, and exact manner of assemblage without departing from the scope of my invention.

In the drawings, Figure 1 is a view in perspective of a pipe-union characterizing my invention. Fig. 2 is a longitudinal sectional view of the same.

The union characterized in my invention is composed of four parts, consisting of a sleeve 1, a swiveled member 2, a clamping member 3, and a gasket or seal 4, which may be of rubber, leather, soft metal, or of any material suited to the purpose.

The sleeve 1 is of hollow structure, having one end constricted, as at 5, to inclose the spherical or ball head 6 of the swiveled member, the other end of the sleeve being provided internally with threads 7 and externally with a plurality of flat faces 8, to be engaged by a wrench to effect turning of the sleeve upon the externally-threaded head 9 of the clamping member 3, thereby to effect drawing together of the two members. It should be understood that while the sleeve 1 is constricted, as shown at 5, to engage the spherical or ball head 6, it is by no means necessary that the said parts should be ground in order to fit tightly together at various points of adjustment, the device being not intended as a universal joint, in which the free movement of parts with relation to each other is essential. On the contrary, the said sleeve, as well as the ball member, may consist of ordinary castings, which, while it is desirable that they should be as smooth and even as they may conveniently be, are not to be ground to fit each other. Moreover, the said sleeve may be described as having walls, the thickness of which is equal throughout the length of said sleeve, except at its inner end, where it is reinforced or thickened to form the external wrench-seat, the outer end of said sleeve being in no wise reinforced or otherwise prepared to form a seat for the spherical head 6, except by the mere constriction of the outer end of said sleeve. The head 6 of the swiveled member is a hollow bulb having an opening 10, constituting a continuation of the bore of the tubular shank 11, the latter being of less diameter than the bulb portion and projected some distance outward beyond the sleeve and provided with interior threads for a purpose described further on. The opening 10 is to be of such size that should the swiveled member be disposed at an angle to the sleeve, as indicated by dotted lines in Fig. 2, there will still be an uninterrupted passage through the union for the travel of fluids or liquids. In order further to obviate the presentation of any obstruction to the passage of fluids or liquids through the union, the head 9 of the clamping member is chambered or enlarged, as at 12, the walls of the chamber to aline with the inner wall of the gasket 4, as clearly shown in Fig. 2, so that when the swiveled member is disposed at a comparatively sharp angle to the sleeve the opening 10 will still remain unobstructed, thereby permitting free passage through the union. This feature constitutes an important essential of the present invention and one that strongly defines it from unions in common use, and will be found to present a point of especial advantage where the union is employed for connecting two sections of a pipe that are not in alinement.

The inner face of the head 9 of the clamping member is square and presents a shoulder or abutment against which the gasket bears, thereby causing the gasket firmly to seat itself against the periphery of the head 6, and in order that this head shall be self-seating, irrespective of the angle it may occupy with relation to the clamping member, the gasket is for a portion of its width internally tapered or reduced, as at 13, thus to cause the head to be closely and evenly borne upon by the entire bearing-surface of the gasket, and thereby present a thoroughly-effective fluid-tight juncture between the parts. While this construction of the gasket may be found desirable, it is not necessary, and the ordinary flat washer may be substituted when desired. It will be seen that when the parts are assembled the spherical bulb or head will simply be forced into contact with the constricted end of the sleeve 1, which prevents its escape, while a fluid-tight joint is formed by the pressure of the clamping member 9 against the gasket 4, which forces the latter into contact with the outer walls of the head or bulb 6 and the inner walls of the sleeve 1, thus making a permanent and absolutely-tight joint. The outer end of the clamping member and the shank of the swivel member are in this instance internally threaded as at 14, to be engaged by the externally-threaded pipe-sections 15; but it is to be understood that the said members may be externally threaded and still be within the scope of my invention.

In operation when two pipe ends are to be connected by my improved joints the members 2 and 3 are respectively connected with such pipe ends, the member 2 having been previously adjusted in the sleeve 1. The gasket 4 is then placed in position, and the pipe ends are then brought together until the externally-threaded clamping member is brought into alinement with the internally-threaded end of the sleeve 1, thus enabling the parts to be secured together until the part 9 of the clamping member forces the gasket 4 into contact with the sleeve 1 and the head 6 to effect a perfectly tight joint. This operation is extremely simple and may be performed in a very short time. It is obvious that a coupling thus constructed has the advantage of enabling disconnection to be readily made, which is obviously impossible where wipe-joints are employed.

My improved device may be constructed at a cost not exceeding a few cents and may be readily adapted for a variety of purposes which will readily suggest themselves to those skilled in the art to which it appertains.

Having thus described the invention, what I claim as new is—

A pipe-union of the class described comprising three rough castings, namely, a coupling-sleeve having walls of approximately equal thickness throughout its length, except at its outer end where said walls are thickened or reinforced to form a wrench-seat, the inner end of said sleeve being constricted to prevent the passage therethrough of a bulb-like or approximately spherical member constituting the second part of the coupling and having an outwardly-extending pipe member and a clamping member interiorly engaging the outer end of said sleeve, in combination with a gasket interposed between said clamping member, the bulb-like head and the inner walls of the sleeve, the engaging ends of the sleeve and the clamping member being threaded together.

In testimony that I claim the foregoing as my own I have hereto affixed my signature in the presence of two witnesses.

LLEWELLYN H. FLORY.

Witnesses:
JOHN J. GUNNEL,
G. L. FENNER.